Patented Oct. 5, 1937

2,094,975

UNITED STATES PATENT OFFICE 2,094,975

METHOD OF HYDROGENATION OF FURFURAL TO FURFURYL ALCOHOL

Homer Adkins and Ralph Connor, Madison, Wis., assignors to The Quaker Oats Company, Chicago, Ill., a corporation of New Jersey No Drawing. Application May 18, 1932, Serial No. 612,169

5 Claims. (Cl. 260—54)

Our invention relates to an improved mode for producing furfuryl alcohol from furfural. Heretofore, so far as we are aware, the production of furfuryl alcohol from furfural has been by a gaseous phase reduction, or a liquid phase reduction with nickel or platinum catalysts. The gaseous phase reduction has side reactions which reduce the yield of the alcohol and provide a mixture from which the alcohol is removed. The liquid phase reduction with a nickel catalyst requires an accurate control to prevent over-hydrogenation with the formation of tetrahydrofurfuryl alcohol in large quantities. The present invention has as one of its principal objects a mode of reducing furfural to furfuryl alcohol on a commercial scale so as to avoid the above difficulties. Another object is the rapid production of furfuryl alcohol. This mode also has other advantages such as eliminating the necessity of a solvent for the furfural and reactivation of the catalyst.

We have found that the use of a catalyst comprising copper and chromium in a liquid phase reduction of furfural to furfuryl alcohol gives yields on a commercial scale of nearly 100%. This is due to the discovery that with proper temperature and pressure conditions, at or near the completion of the desired reduction the reaction suddenly becomes very slow and for practical purposes comes to a sharp end point. This end-point is in contrast to a continuing reaction in which the furfuryl alcohol is reduced to tetrahydrofurfuryl alcohol or other compounds. It is this novel characteristic as well as the rapid reaction rate of our mode of operation with said copper-chromium catalyst which renders this mode cheaper and more readily applicable to commercial utilization.

Copper-chromium and copper-chromium-alkaline earth metal catalysts are much more active in the reduction of furfural than a copper-molybdenum catalyst, a copper-molybdenum-alkaline earth metal catalyst, a copper-vanadium catalyst, a zinc-chromium-alkaline earth metal catalyst and thereby show an outstanding and marked superiority over such catalysts, which superiority was wholly unforeseen.

The copper-chromium-alkaline earth metal catalysts used herein may be prepared by several methods of which examples are given below:

Example No. 1

Solutions of three metallic nitrates are prepared separately as follows: 50 parts of barium nitrate, $Ba(NO_3)_2$, are added to 500 parts of boiling water; 750 parts of hydrated chromium nitrate, $Cr(NO_3)_3$—$15H_2O$, are added to 4500 parts of warm water; and 1000 parts of hydrated copper nitrate, $Cu(NO_3)_2$—$3H_2O$, are added to 1500 parts of water. The three solutions are mixed and 950 parts of ammonium carbonate monohydrate, $(NH_4)_2CO_3$—$H_2O$, in 5500 parts of water are added thereto. There is a considerable amount of effervescence and a very voluminous precipitate is formed. The precipitate is filtered with suction, washed twice with water, dried at 110–120° C., pulverized, and then decomposed by heating, which preferably should be conducted below red heat.

Example No. 2

9000 parts by weight of a solution containing 2610 parts by weight of copper nitrate trihydrate: $Cu(NO_3)_2$—$3H_2O$, and 300 parts by weight of barium nitrate (or 270 parts of calcium nitrate tetrahydrate, $Ca(NO_3)_2$—$4H_2O$) are added to 9000 parts by weight of a solution containing 1500 parts ammonium dichromate and 2250 parts by weight of 28% ammonium hydroxide. When these solutions are mixed a precipitate is formed and the precipitation is assisted by maintaining the temperature of the mixture slightly below 100° C. The precipitate is filtered, the cake being pressed and sucked as dry as possible. After drying in an oven at 75–80° C. over night, the precipitate is pulverized and decomposed as described in Example No. 1.

As a specific example of our mode when using a copper-chromium-alkaline earth metal catalyst, we place 8 parts by weight of copper-chromium catalyst prepared as described in Example No. 1, together with 250 parts by weight of furfural in a jacketed autoclave provided with an agitator. The autoclave is closed and the air is substantially removed by flushing with carbon dioxide or hydrogen. Hydrogen is then admitted until a pressure of 1500 pounds per square inch is attained. Throughout the course of the reaction the hydrogen pressure is maintained at substantially 1500 lbs. per sq. inch. The mixture is agitated and the temperature of the autoclave is raised to about 150° C. by passing steam into the jacket. When the temperature of the autoclave has risen to a point usually between 95° C. and 140° C., the reaction between the hydrogen and furfural begins and becomes quite rapid. This reaction is exothermic and under the conditions of operation, after the reaction has attained sufficient velocity cold water is passed through the jacket to keep the temperature of the autoclave from rising substantially above 160° C.

A high reaction rate continues until approximately 0.98 molecular equivalents of hydrogen have reacted, at which time the reaction rate decreases rapidly to almost zero. Under the specific conditions given in this example we obtain the reaction of one molecular equivalent of hydrogen in twenty minutes or less, with a resultant product containing at least 98% of furfuryl alcohol.

The quantity of the catalyst used is chosen according to the speed of reaction desired. Increase in the temperature and/or pressure decreases the time of reaction. Commercial considerations generally dictate the specific conditions of temperature and pressure. Good results have been obtained between pressures of 400 and 3,000 pounds per square inch and between temperatures of 110° C. and 175° C. Higher temperatures sometimes cause the formation of gummy substances or other by-products. The temperature need not be maintained constant throughout the reaction.

The activity of a catalyst varies with the method of preparing it, including the use of an alkaline earth metal which tends to act as a stabilizer. The activity may vary even between batches of catalysts made by the same method. The activity of the catalyst determines the quantity to be used.

The exact composition of the catalysts named is not known by us. The composition and/or activity of the catalysts probably vary with the amount of ammonium hydroxide added, with the temperature of precipitation, etc. Therefore, we do not limit our invention to the use of catalysts prepared only by the examples given.

This application is a continuation in part of pending application Serial No. 556,710, entitled "Method of hydrogenating organic compounds", and filed in the Patent Office on August 12, 1931.

We claim:

1. A process for preparing furfuryl alcohol which comprises treating liquid furfural with hydrogen in the presence of a copper-chromium-alkaline earth metal catalyst.

2. A process for preparing furfuryl alcohol which comprises bringing liquid furfural into contact with hydrogen under superatmospheric pressure in the presence of a copper-chromium-alkaline earth metal catalyst, and controlling the speed of reaction through control of the temperature of the reaction.

3. A process for preparing furfuryl alcohol which comprises treating liquid furfural with hydrogen under superatmospheric pressure in the presence of a copper-chromium-alkaline-earth-metal catalyst, and controlling the speed of reaction through control of the pressure of the hydrogen and of the temperature of the reaction.

4. A process for preparing furfuryl alcohol which comprises treating liquid furfural with hydrogen in the presence of a copper-chromium-barium catalyst.

5. A process for preparing furfuryl alcohol which comprises treating liquid furfural with hydrogen in the presence of a copper-chromium-calcium catalyst.

HOMER ADKINS.
RALPH CONNOR.